(12) United States Patent
Maeng (10) Patent No.: US 9,055,187 B1
(45) Date of Patent: Jun. 9, 2015

(54) METHODS, DEVICES, AND MEDIUMS FOR DISPLAYING AN IMAGE (75) Inventor: Joon Maeng, Newcastle, WA (US)

(73) Assignee: Intellectual Ventures Fund 79 LLC, Las Vegas, NV (US)

( * ) Notice: Subject to any disclaimer, the term of this patent is extended or adjusted under 35 U.S.C. 154(b) by 700 days.

(21) Appl. No.: 13/339,815

(22) Filed: Dec. 29, 2011

(51) Int. Cl.
*H04N 7/14* (2006.01)
(52) U.S. Cl.
CPC ..................................... *H04N 7/144* (2013.01)
(58) Field of Classification Search
CPC ....................................................... H04N 7/144
USPC ......................... 345/76–107, 207; 348/333.01
See application file for complete search history.

(56) References Cited

U.S. PATENT DOCUMENTS

2010/0066800 A1\* 3/2010 Ryf et al. .................... 348/14.01

\* cited by examiner

*Primary Examiner* — Michael Pervan
(74) *Attorney, Agent, or Firm* — Stolowitz Ford Cowger LLP (57) ABSTRACT

A method, device and/or medium for sensing, by an image sensor in an imaging device, light corresponding to an image, in which the image sensor is one of a plurality image sensors interleaved with a plurality of picture elements in the imaging device and displaying, by a picture element in the imaging device, a representation of the image, in which the picture element is one of the plurality of picture elements.

22 Claims, 7 Drawing Sheets

FIG. 7 ent of pixels 26, sub-pixels 21, 23 and 25 and image sensors 24 in array 20 may vary and claimed subject matter is not limited in this regard. For example, in FIG. 2, sub-pixels 21, 23, and 25 and image sensors 24 are depicted as having a rectangular shape and are interleaved in array 20 in straight columns. However, FIG. 3 depicts another example of display screen 12 in which sub-pixels 21, 23, and 25 and image sensors 24 are shown having a circular shape and are interleaved in array 20 in diagonal columns.

METHODS, DEVICES, AND MEDIUMS FOR DISPLAYING AN IMAGE

BACKGROUND

A known system for displaying an image includes an image capture device positioned on an outside, e.g., on top of a display screen. The known image capture device does not align with a location of an eye of a user because the image capture device is positioned outside of the display screen. For example, with respect to a video conferencing system, a camera may be positioned outside of the display screen, e.g., may be positioned on top of an upper border of the display screen. Consequently, a user has to avert their eyes away from the display screen in order to capture an image in which it appears that the user is looking directly into the camera. This makes it difficult to take desirable pictures, such as desirable self-portraits associated with the user and/or makes it difficult for the user to make eye contact with another user participating in a videoconference.

DETAILED DESCRIPTION

Figure 1:
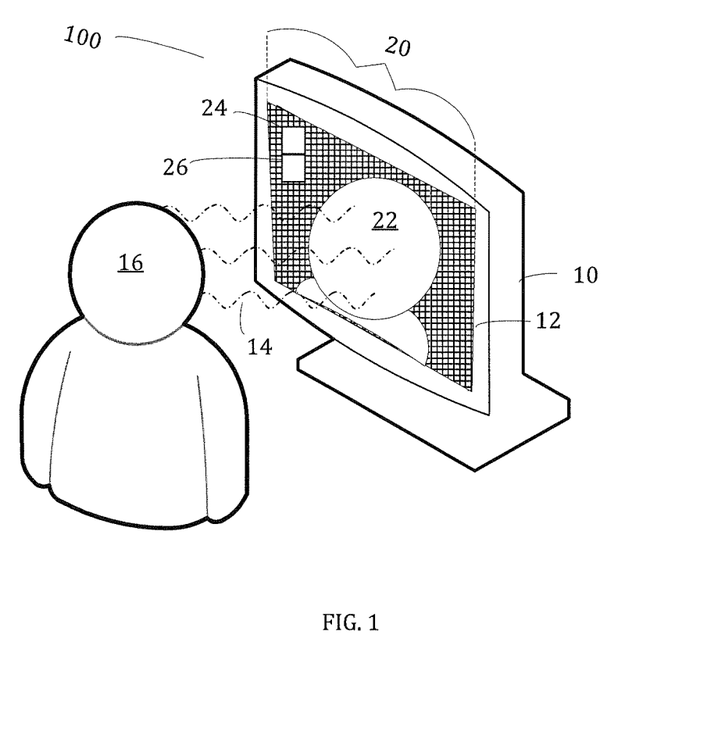
FIG. 1 depicts an example of a system for displaying an image.

FIG. 1 depicts an example of a system 100 for generating an image 22 comprising an image capture device 10. Image capture device 10 may be a mobile communication device, a personal computer (PC), a laptop computer, a television, a video conference terminal and/or a tablet device, or the like, or any combinations thereof. Imaging device 10 may comprise a display screen 12.

In one example, display screen 12 may comprise an embedded array 20 including an image sensor 24 disposed adjacent to a picture element (pixel) 26 in array 20. Array 20 may comprise a plurality of additional image sensors interleaved with a plurality of other pixels in display screen 12. Display screen 12 may comprise, for example, a Liquid Crystal Display (LCD), a plasma display, a liquid crystal on silicon (LCOS) display, an organic light-emitting diode (OLED) display or a thin-film transistor (TFT) display, or the like, or any combinations thereof.

In an example, image sensor 24 may be configured to sense light 14 reflecting from an object 16, such as a user. Image sensor 24 may be any known sensor, such as, a charge coupled device (CCD) and/or a complementary metal-oxide-semiconductor (CMOS) device.

In one example, pixel 26 may be configured to display a representation of light 14 sensed by corresponding image sensor 24 via any display technologies known to those of skill in the art. For example, pixel 26 may be an LCD pixel, a plasma pixel, an LCOS pixel, an OLED pixel or a TFT pixel, or the like, or any combinations thereof.

In an example, pixel 26 may be disposed proximate and/or directly adjacent to image sensor 24 in array 20. In another example, image sensor 24 and pixel 26 may be separated by one or more other sensors and/or pixels in array 20.

Figure 2:
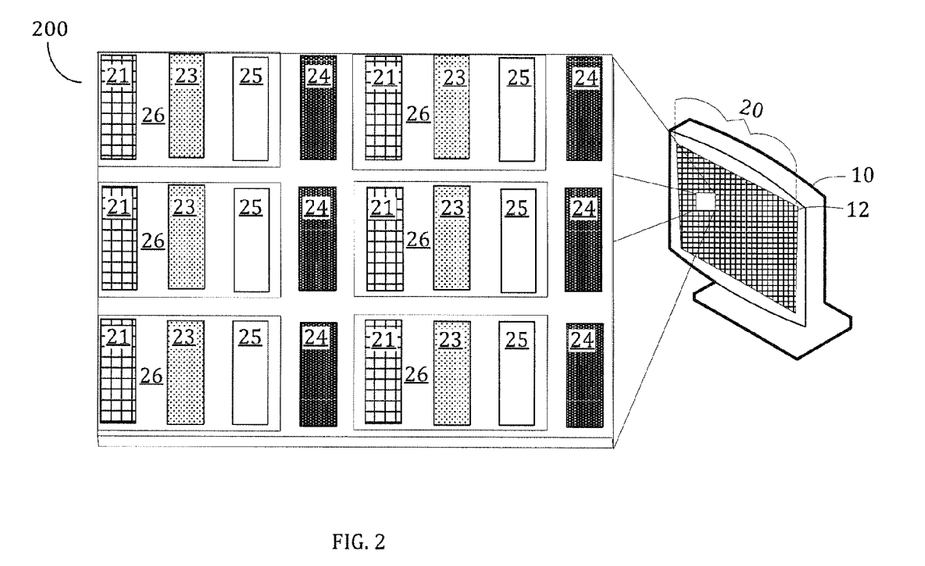
FIG. 2 depicts an example of an apparatus for displaying an image.
Figure 3:
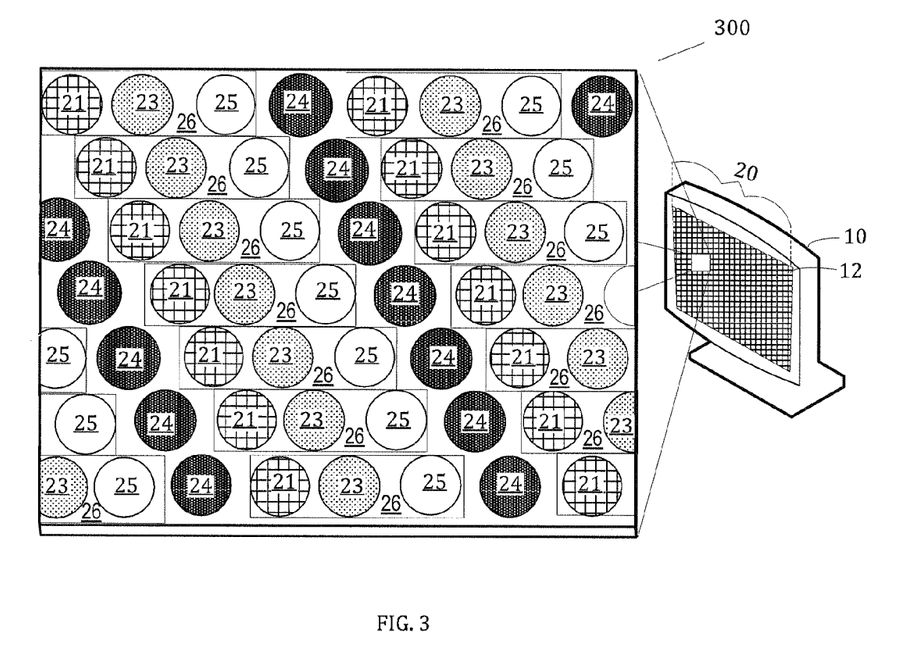
FIG. 3 depicts another example of an apparatus for displaying an image.

FIG. 2 depicts an example of a portion 200 of array 20 in display screen 12. In one example, array 20 may comprise a plurality of pixels 26 interleaved with a plurality of image sensors 24. Pixels 26 each may comprise sub-pixels including, for example, a red sub-pixel 21, a green sub-pixel 23 and a blue sub-pixel 25, or the like, or any combination thereof. Image sensors 24 each may comprise multiple sub-elements, as described in greater detail below.

In one example, array 20 may comprise 1024 columns and 768 rows of image sensors 24 and pixels 26. Thus, in this example, display screen 12 may include 2,359,296 sub-pixels and sub-elements. Size, shape, pattern, number and alignm Referring now to both FIG. 2 and FIG. 3, a number and arrangement of pixels 26, sub-pixels 21, 23 and 25 and/or image sensors 24 may be implementation specific. In one example, in array 20, image sensors 24 may be interleaved with pixels 26 in varying densities over display screen 12. Image sensors 24 may be arranged more densely in a center of display screen 12 and/or in one or more corners of display screen 12. Such an arrangement may optimize image capture. In an example, numbers of pixels 26 and image sensors 24 may be equal. In another example, numbers of pixels 26 and image sensors 24 may not be equal. In yet another example, image sensors 24 and pixels 26 may be arranged in a repeating pattern across display screen 12.

Figure 4A:
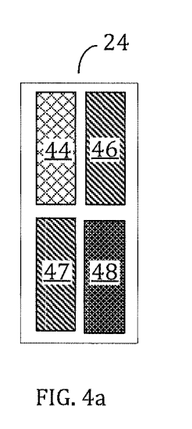
FIG. 4a depicts yet another example of an apparatus for displaying an image.

FIG. 4a depicts an example of image sensor 24. Image sensor 24 may comprise any number of sub-elements. For example, single image sensor 24 may comprise four sub-elements including a red sub-element 44, green sub-elements 46 and 47 and/or blue sub-element 48, or the like, or any combinations thereof. Size, shape, number and/or arrangement of sub-elements 44, 46, 47 and 48 of image sensor 24 may vary and claimed subject matter is not limited in this regard.

Figure 4B:
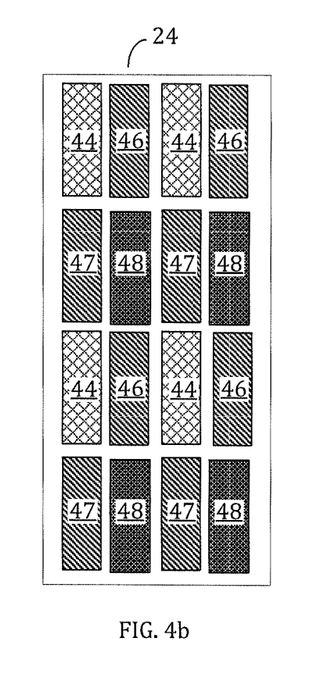
FIG. 4b depicts still another example of an apparatus for displaying an image.

FIG. 4b depicts another example of image sensor 24. Image sensor 24 may comprise sixteen sub-elements including four red sub-elements 44, four green sub-elements 46, four green sub-elements 47 and/or four blue sub-elements 48. Size, shape, number and/or arrangement of sub-elements 44, 46, 47 and 48 of image sensor 24 may vary and claimed subject matter is not limited in this regard.

Figure 4C:
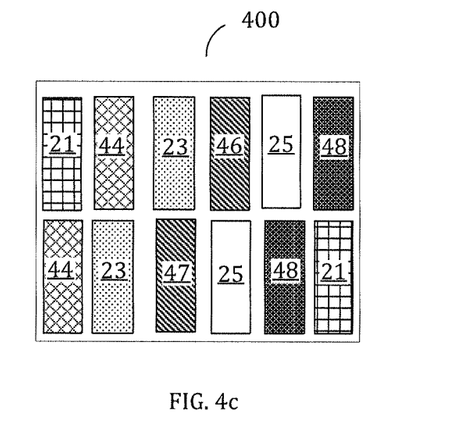
FIG. 4c depicts still yet another example of an apparatus for displaying an image.

FIG. 4c depicts an example of a portion 400 of array 20 in which sub-elements 44, 46, 47 and 48 of image sensor 24 are interleaved with sub-pixels 21, 23 and 25 of pixel 26. In the current example, red sub-pixel 21 is disposed adjacent to red sub-element 44, green sub-pixel 23 is disposed adjacent to green sub-element 46 or green sub-element 47 and blue sub-pixel 25 is disposed adjacent to blue sub-element 48. However, other interleaving arrangements of sub-pixels 21, 23 and 25 and sub-elements 44, 46, 47 and 48 are possible and claimed subject matter is not limited in this regard.

Figure 5A:
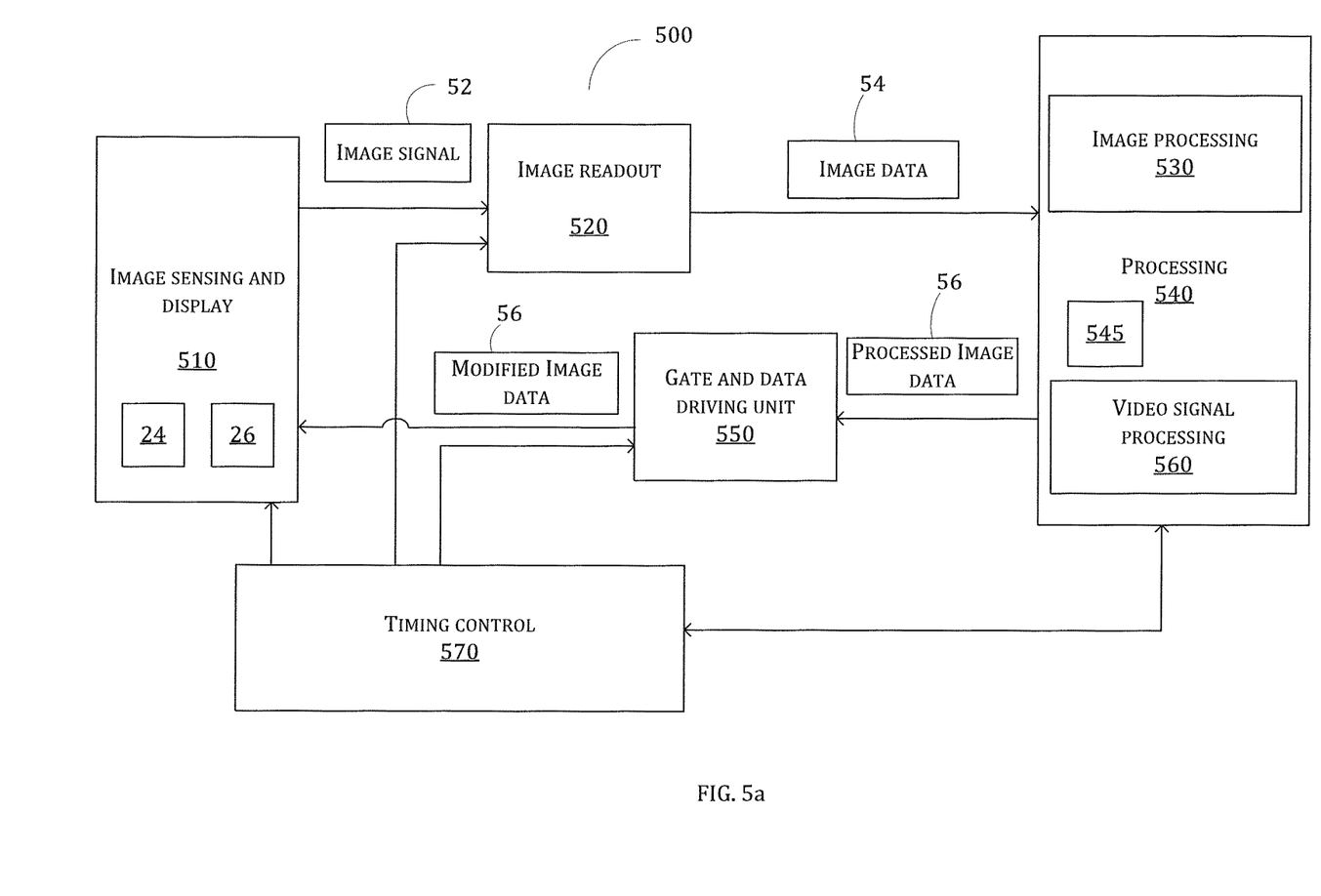
FIG. 5a depicts another example of a system for displaying an image.

FIG. 5a is a block diagram depicting an example of a system 500 for displaying image 22. System 500 may comprise an image sensing and display unit 510. Image sensing and display unit 510 may comprise image sensor 24 and pixel 26 for displaying image 22 by emitting light of a particular color and intensity. Image sensor 26 and pixel 24 may be selected from array 20. Array 20 may comprise a plurality of other image sensors co-located with a plurality of other pixels in display screen 12 (see FIG. 1).

In an example, upon sensing light 14 (FIG. 1), image sensor 24 may generate an image signal 52 and may output image signal 52 to an image readout unit 520 for readout. Image signal 52 may be an analog signal. In one example, image readout unit 520 may convert image signal 52 into digital image data 54. Digital image data 54 may identify pixel 26, image sensor 24, a position and/or associated color of pixel 26, and/or a position and/or associated color of image sensor 24. Digital image data 54 also may indicate whether image sensor 24 is associated with pixel 26. Image readout unit 520 may output digital image data 54 to a processing unit 540 for modifying digital image data 54.

In an example, processing unit 540 may include an image processing unit 530 and/or a video signal processing unit 560 for modifying digital image data 54. Image processing unit 530 and/or video signal processing unit 560 may be separate processing devices or may be a single processing device. Digital image data 54 may undergo processing by image processing unit 530 and/or video signal processing unit 560.

In an example, processing unit 540 may be configured to detect a distortion of light 14 sensed by image sensor 24 based at least in part on digital image data 54. Processing unit 540 may be configured to modify digital image data 54 based on the detected distortion. In another example, if pixel 26 emits light, the light emitting from pixel 26 may distort light 14 sensed by image sensor 24. Processing unit 540 also may be configured to modify digital image data 54 to compensate for light distortions associated with pixel 26. Processing unit 540 further may detect and/or compensate for light distortions associated with other causes and claimed subject matter is not limited in this regard.

In an example, processing unit 540 may be configured to modify digital image data 54 to conform to a particular output format for displaying digital image data 54. In another example, processing unit 540 may be configured to determine a position of image sensor 24 and/or pixel 26. Processing unit 540 may modify digital image data 54 based on the position of image sensor 24 and/or pixel 26.

In an example, processing unit 540 may be configured to determine whether image sensor 24 is associated with pixel 26 and/or one or more other pixels in array 20. Processing unit 540 may modify digital image data 54 based on an association of image sensor 24 with pixel 26 and/or the one or more other pixels. In one example, such an association may be determined by a variety of methods and claimed subject matter is not limited in this regard. For example, the association may be stored in a database 545 accessible by processing unit 540 and/or the association may be communicated to processing unit 540 via digital image data 54.

As discussed below in greater detail with respect to FIG. 8, in one example, processing unit 540 may be configured to determine a local image sensor density associated with image sensor 24 and to modify image data 54 based on the local image sensor density.

In an example, processing unit 540 may be configured to output processed image data 56. Processed image data 56 may be configured to control and to selectively activate and/or deactivate pixel 26. Processing unit 540 may output processed image data (i.e., analog signals) 56 to image sensing and display unit 510 via gate and data driving unit 550. In an another example, processing unit 540 may communicate processed image data 56 directly to image sensing and display unit 510 and/or may route processed image data to image sensing and display unit 510 via one or more a different intermediary units and claimed subject matter is not limited in this regard.

System 500 may include a timing control unit 570. Timing control unit 570 may be configured to produce control signals for image sensing and display unit 510, image readout unit 520 and gate and data driving unit 550.

Figure 5B:
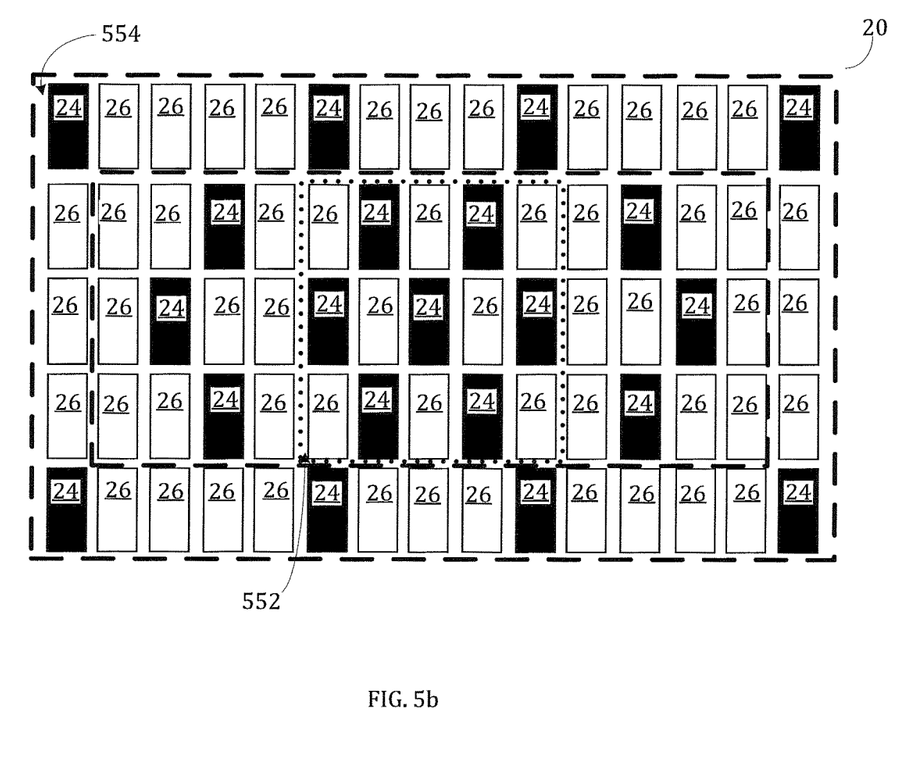
FIG. 5b depicts yet another example of an apparatus for displaying an image.

FIG. 5b depicts an example of array 20 including a plurality of image sensors 24 and a plurality of pixels 26. In an example, local densities of image sensors 24 in array 20 may vary. For example, a density of image sensors 24 may be greater in a center portion 552 of array 20 than on a periphery 554 of array 20. Processing unit 540 may be configured to determine a local image sensor density associated with image sensors 24 by a variety of methods. In another example, image sensors 24 may be equally spaced and the processing unit 540 may selectively process signals. For instance, processing element 540 may select more image signals at a center of array 20 and fewer signals around the edges of array 20. In an example, local image sensor density associated with image sensor 24 may be predetermined. A predetermined local density may be mapped to image sensor 24 in database 545. Processing unit 540 may be configured to modify digital image data 54 based on the local image sensor density associated with image sensors 24.

Figure 6:
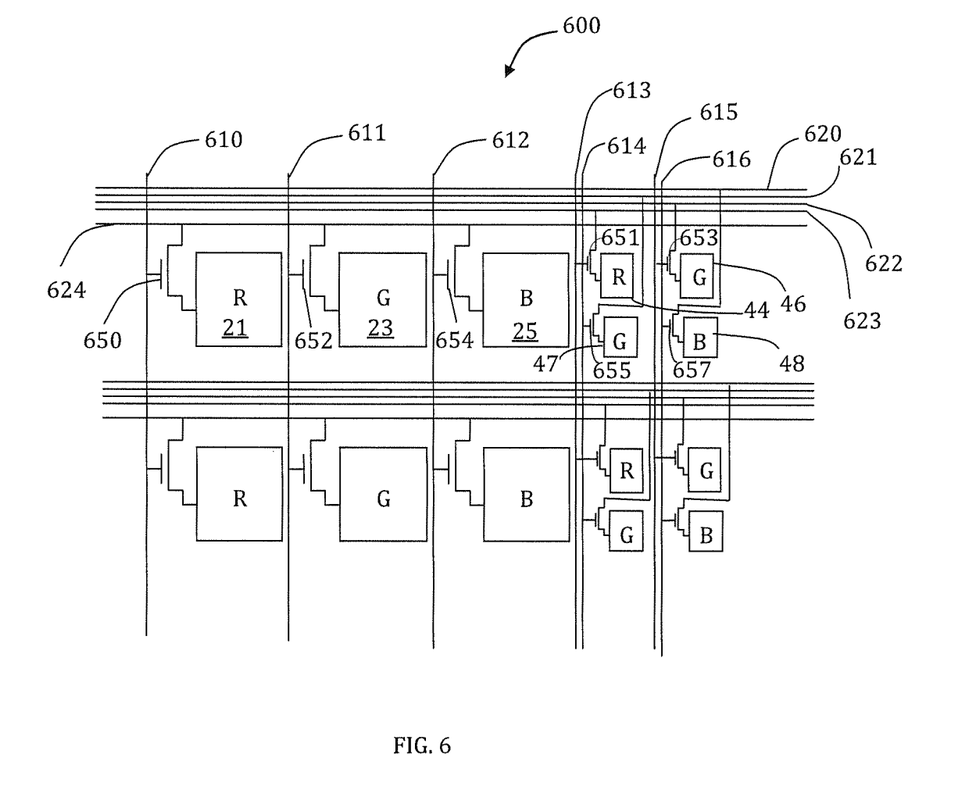
FIG. 6 depicts still another example of a circuit for displaying an image.

FIG. 6 is a schematic diagram depicting an example of a circuit 600 in array 20 comprising red sub-pixel 21, green sub-pixels 23, and blue sub-pixel 25 interleaved with red sub-element 44, green sub-elements 46, and blue sub-element 48. In an example, red sub-pixel 21 may correspond to red sub-element 44, green sub-pixel 23 may correspond to green sub-elements 46, and/or blue sub-pixel 25 may correspond to blue sub-element 48. In another example, sensor 24 may correspond to a plurality of pixels and/or pixel 26 may correspond to a plurality of sensors. In yet another example, one or more sub-elements of sensor 24 may correspond to one or more sub-pixels of pixel 26. In another example, display elements 21, 23, and/or 25 may not correspond to particular sensing elements 44, 46, 47, and/or 48. Processing unit 540 may process image 22 sensed by sensing elements 44, 46, 47, and/or 48 and display them at appropriate display elements 21, 23, and/or 25.

In an example, timing control unit 570 (see FIG. 5) may produce control signals for lines 610, 611, 612, 613, 614, 615, 616, 620, 621, 622, 623 and 624. Circuit 600 may also comprise transistor gates 650, 652 and 654 each coupled to respective ones of red sub-pixel 21, green sub-pixel 23, and blue sub-pixel 25. Circuit 600 further may comprise transistor gates 651, 653, 655 and 657 each coupled to respective ones of red sub-element 44, green sub-elements 46, and blue sub-element 48. Red sub-element 44, green sub-elements 46 and 47 and/or blue sub-element 48 each may be configured to sense light and to generate an image signal 52 (FIG. 5) responsive to sensing light.

In an example, if red sub-element 44 senses light then red sub-element 44 may generate image signal 52 responsive to sensing light. Red sub-element 44 may communicate image signal 52 to image readout unit 520 (FIG. 5a) via transistor gate 651, vertical line 613 and horizontal line 623. Similarly, blue sub-element 48 may generate image signal 52 responsive to sensing light. Blue sub-element 48 may communicate image signal 52 to image readout unit 520 via transistor gate 657, vertical line 616 and horizontal line 620. Likewise, if green sub-element 46 senses light then green sub-element 46 may communicate image signal 52 to image readout unit 520 via transistor gate 653, horizontal line 622 and vertical line 615. If green sub-element 47 senses light then green sub-element 47 may communicate image signal 52 to image readout unit 520 via transistor gate 655, horizontal line 621 and vertical line 614.

In an example, image signal 52 may be communicated to processing unit 540 (FIG. 5a) for image processing. Processing unit 540 may send processed image data 56 to gate and data driving unit 550 (FIG. 5a). Corresponding ones of red sub-pixel 21, green sub-pixel 23, and/or blue sub-pixel 25 may receive control signals from gate and data driving unit 550 responsive to processed image data 56 (FIG. 5a) and may emit light responsive to receiving processed image data 56.

In an example, responsive to processed image data 56, gate and data driving unit 550 may send a control signal for activating and/or deactivating red sub-pixel 21 via horizontal line 624, vertical line 610 and transistor gate 650. Similarly, responsive to processed image data 56, gate and data driving unit 550 may send a control signal for activating and/or deactivating green sub-pixel 23 via horizontal line 624, vertical line 611 and transistor gate 652. Likewise, responsive to processed image data 56, gate and data driving unit 550 may send a control signal for activating and/or deactivating blue sub-pixel 25 via horizontal line 624, vertical line 512 and transistor gate 654.

In other examples, patterns of sub-pixels, sub-elements, gates, horizontal and vertical lines may vary. One or more horizontal lines and/or vertical lines may be shared between sub-elements and/or sub-pixels to minimize the space used by lines.

Figure 7:
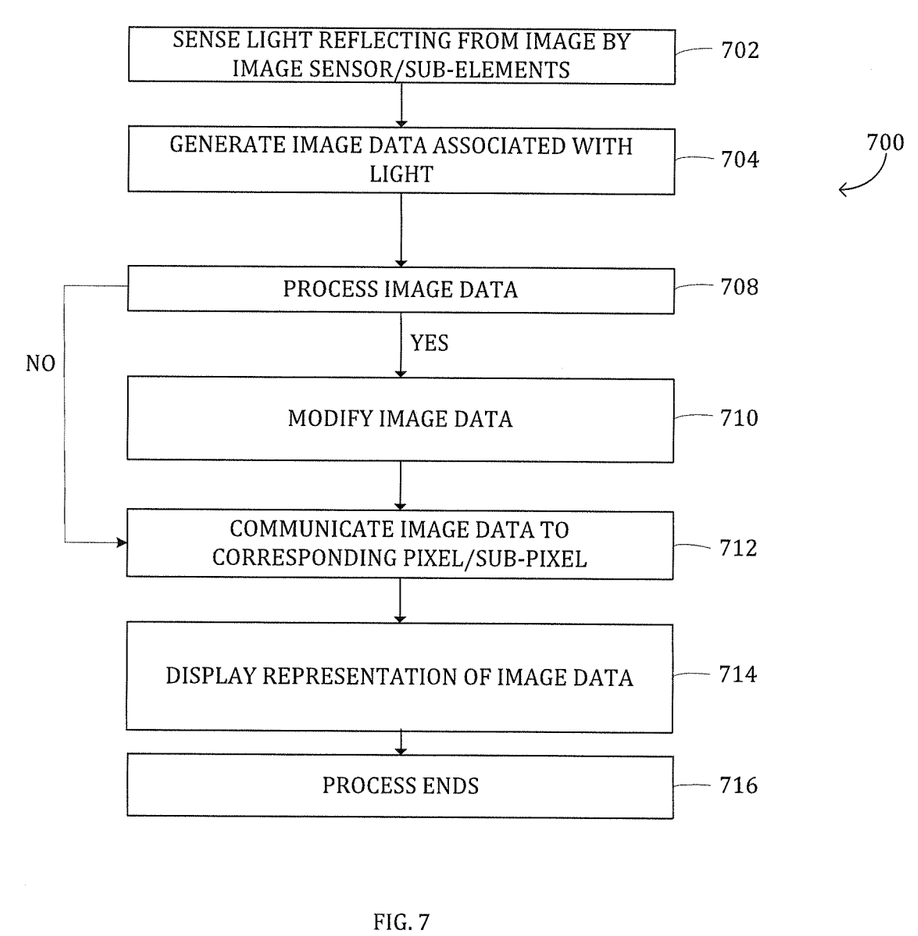
FIG. 7 depicts still yet another example of a process for displaying an image.

FIG. 7 depicts an example of a process 700 for generating an image in which image sensors and/or sensor sub-elements are interleaved with pixels and/or sub-pixels in a display screen 12. Process 700 begins at operation 702 where image sensor 24 and/or sub-elements 44, 46, 47 and/or 48 may sense light 14 associated with an object 16 and may generate image signal 52. In operation 704, a processing device comprising one or more processors may receive image signal 52 and generate image data 54 based on the image signal 52.

In operation 708, the processing device may process image data 54 and determine whether the image data 54 is to be modified. If it is determined that the image data 54 is not to be modified, then the process moves to operation 712 where the processing device communicates the processed image data 56 to corresponding pixel 26 and/or sub-pixels 21, 23 and/or 25.

If it is determined that the image data 54 is to be modified, then the process moves to operation 710 where the processing device modifies the image data 54. In an example, the processing device may modify image data 54 to compensate for light effects associated with proximity of image sensor 24 to pixel 26. The processing device may modify the format of image data 54 to conform to a format for displaying image 22. The processing device may determine a local image sensor density associated with image sensor 24 and modify the image data 54 based on the local image sensor density. The processing device also may determine a position of image sensor 24 and/or a one or more corresponding pixels or sub-pixels and modify the image data 54 based on the position of the image sensor 24 and/or the pixels and/or sub-pixels.

The process moves to operation 712, where the processing device communicates processed image data 56 (modified or unmodified) to one or more pixels and/or sub-pixels corresponding to image sensor 24. In operation 714, one or more pixels in array 20 receive the processed image data 56 and display a representation of the object as image 22 responsive to the image data 56. Process 700 ends at operation 716.

The system and apparatus described above may use dedicated processor systems, micro controllers, programmable logic devices, microprocessors, or the like, or any combination thereof, to perform some or all of the operations described herein. Some of the operations described above may be implemented in software and other operations may be implemented in hardware. One or more of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via lineless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a conventional rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or the like, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of examples, it should be apparent that the examples may be modified in arrangement and detail without departing from such principles. We claim all modifications and variation coming within the spirit and scope of the following claims.

The invention claimed is:

1. A method comprising:
   sensing, by a plurality of image sensors in an imaging device, light corresponding to an image, wherein the plurality of image sensors are interleaved with a plurality of picture elements in the imaging device;
   determining, by a processing device, a local density of the plurality of image sensors, and modifying, by the processing device, the image data based on the local density; and
   communicating for display the image data modified based on the local density.

2. The method of claim 1, wherein the processing further comprises:
   determining, by the processing device, a distortion of the light reflecting from the image; and
   modifying, by the processing device, the image data based on the distortion.

3. The method of claim 2, wherein the distortion is associated with one or more of the plurality of picture elements.

4. The method of claim 1, further comprising processing, by a processing device, image data associated with the image, wherein the processed image data is configured to selectively activate or deactivate picture elements.

5. The method of claim 1, further comprising processing, by a processing device, image data associated with the image to a particular format for displaying.

6. The method of claim 1, further comprising:
   identifying, by the processing device, a position of image sensors in a display of the imaging device; and
   modifying, by the processing device, the image data based on the position.

7. The method of claim 1, wherein the plurality of picture elements are interleaved with the plurality of image sensors in a repeating pattern.

8. The method of claim 1, wherein the displaying further comprises displaying, by two or more picture elements of the plurality of the picture elements, the representation of the image.

9. An apparatus comprising:
   a display device with a plurality of picture elements configured to display an image;
   a plurality image sensors interleaved with the plurality of picture elements and configured to generate image data from light corresponding to an image; and
   a processing device configured to process the image data including determine a local density of the plurality of image sensors, modify the image data based on the local density, and communicate the processed image data for display.

10. The apparatus of claim 9, wherein the processing device is further configured to:
    determine a distortion of the light reflecting from the image; and
    modify the image data based on the distortion.

11. The apparatus of claim 10, wherein the distortion is associated with one or more of the plurality of picture elements.

12. The apparatus of claim 9, wherein the processed image data is configured to selectively activate or deactivate picture elements.

13. The apparatus of claim 9, wherein the processing device is further configured to convert the image data to a particular format for display.

14. The apparatus of claim 9, wherein the processing device is further configured to:
    identify a position of image sensors in a display of the imaging device; and
    modify the image data based on the position.

15. The apparatus of claim 9, wherein the plurality of picture elements are interleaved with the plurality of image sensors in a repeating pattern.

16. A tangible computer-readable memory device having instructions stored thereon that, in response to execution by a processing device, cause the processing device to perform operations comprising:
    capturing light corresponding to an image sensed via a plurality image sensors embedded with a plurality of picture elements of a display device;
    determining, by a processing device, a local density of the plurality of image sensors, and
    modifying, by the processing device, the image data based on the local density; and
    communicating for display the image data modified based on the local density.

17. The tangible computer-readable memory device of claim 16, wherein the processing further comprises:
    determining a distortion of the light reflecting from the image; and
    modifying the image data based on the distortion.

18. The tangible computer-readable memory device of claim 17, wherein the distortion is associated with one or more of the plurality of picture elements.

19. The tangible computer-readable memory device of claim 16, wherein the processed image data is configured to activate or deactivate picture elements.

20. The tangible computer-readable memory device of claim 16, wherein the processing further comprises converting the image data to a particular format for displaying.

21. The tangible computer-readable memory device of claim 16, wherein the processing further comprises:
    identifying a position of image sensors in a display of the imaging device; and
    modifying the image data based on the position.

22. The tangible computer-readable memory device of claim 16, wherein the plurality of picture elements are embedded with the plurality of image sensors in a repeating pattern.

* * * * *